United States Patent
Kwon

(10) Patent No.: US 7,711,944 B2
(45) Date of Patent: May 4, 2010

(54) METHOD AND APPARATUS FOR SECURELY UPDATING AND BOOTING CODE IMAGE

(75) Inventor: Moon-sang Kwon, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 716 days.

(21) Appl. No.: 11/586,517

(22) Filed: Oct. 26, 2006

(65) Prior Publication Data

US 2007/0106890 A1 May 10, 2007

(30) Foreign Application Priority Data

Nov. 7, 2005 (KR) .................. 10-2005-0106081

(51) Int. Cl.
*G06F 15/177* (2006.01)
(52) U.S. Cl. .............................. 713/2; 713/182; 726/27
(58) Field of Classification Search ............... 713/1, 713/2, 182, 191; 726/27
See application file for complete search history.

(56) References Cited

U.S. PATENT DOCUMENTS

| | | | |
|---|---|---|---|
| 5,379,342 A * | 1/1995 | Arnold et al. ............... | 380/2 |
| 6,581,159 B1 * | 6/2003 | Nevis et al. ................. | 713/2 |
| 6,715,085 B2 * | 3/2004 | Foster et al. ............... | 726/27 |
| 7,296,143 B2 * | 11/2007 | Gaskins et al. ............. | 713/2 |
| 7,318,151 B1 * | 1/2008 | Harris ........................ | 713/2 |
| 7,424,611 B2 * | 9/2008 | Hino et al. ................. | 713/167 |
| 2003/0037231 A1 | 2/2003 | Goodman et al. | |
| 2003/0233558 A1 | 12/2003 | Lieberman et al. | |
| 2004/0064457 A1 | 4/2004 | Zimmer et al. | |

FOREIGN PATENT DOCUMENTS

KR 2002-0076596 A 10/2002

* cited by examiner

*Primary Examiner*—Thuan N Du
(74) *Attorney, Agent, or Firm*—Sughrue Mion, PLLC

(57) ABSTRACT

A method and apparatus for securely updating and booting a code image is provided, where a code image is updated in a storage medium storing an operating system having a first region, on which a boot code is loaded, a second region, in which a first code image is stored, and a third region, in which the boot code and first check data for verifying the first code image are stored. Updating a code image includes storing a second code image in the second region, extracting information about a secure one-way function from the first check data, and generating second check data for verifying the second code image using the extracted information of the secure one-way function and storing the generated second check data in the third region. When the second check data is set as a parameter of the secure one-way function, the first check data is generated.

11 Claims, 8 Drawing Sheets

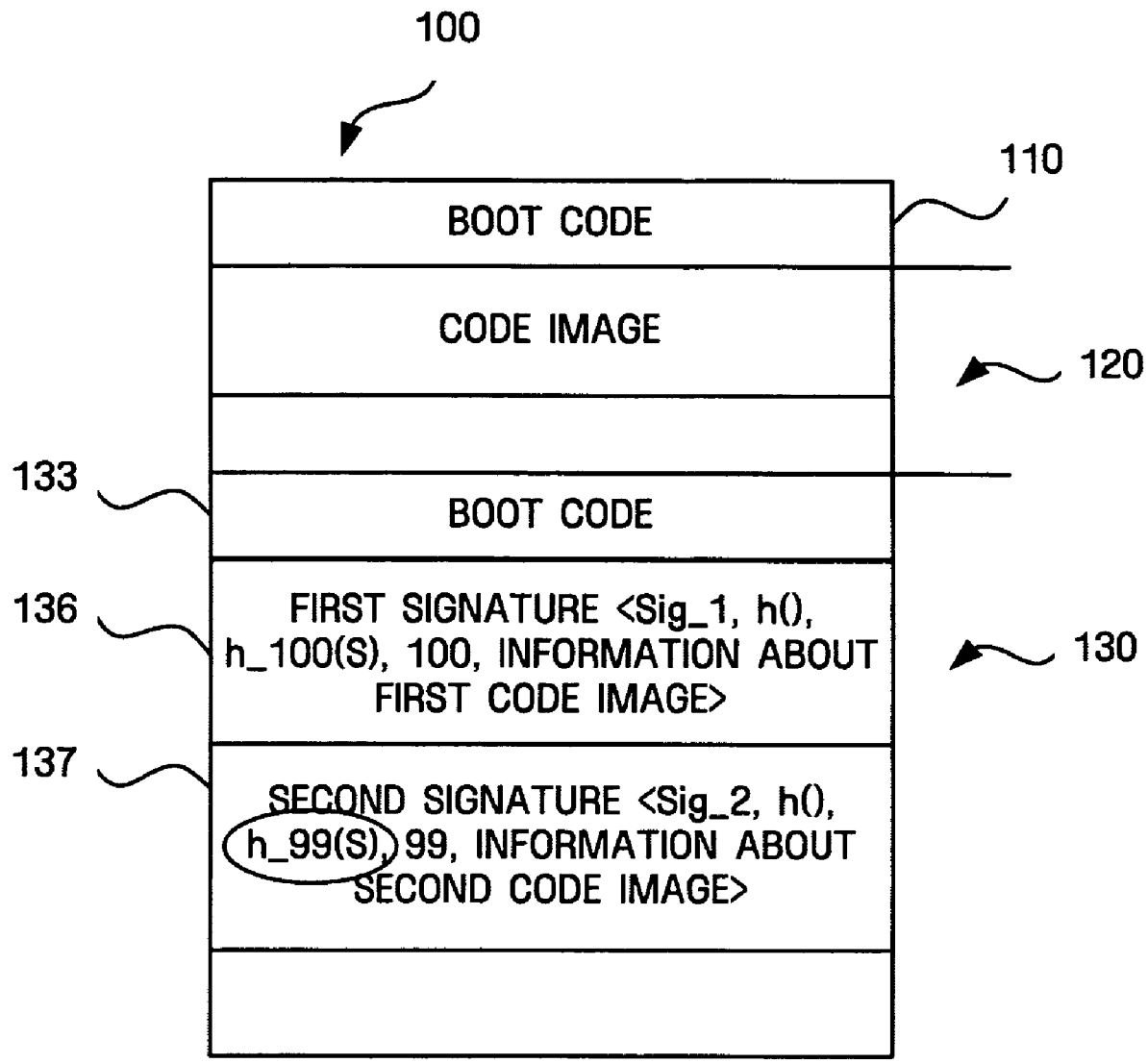
(a) CHANGE OF CODE IMAGE BY AUTHORIZED USER

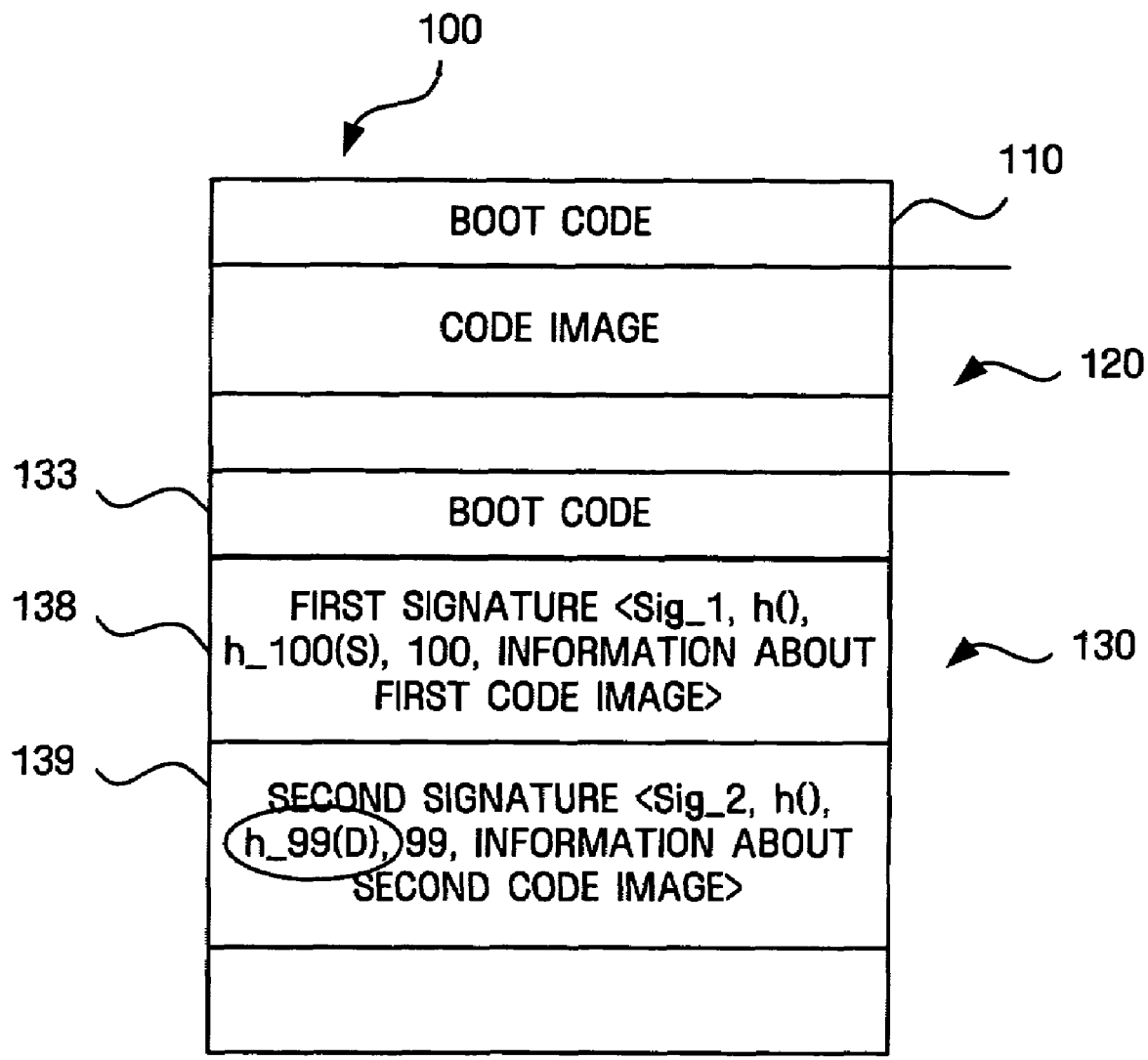
(b) CHANGE OF CODE IMAGE BY UNAUTHORIZED USER

METHOD AND APPARATUS FOR SECURELY UPDATING AND BOOTING CODE IMAGE

CROSS REFERENCE TO RELATED APPLICATION

This application claims priority from Korean Patent Application No. 10-2005-0106081 filed on Nov. 7, 2005 in the Korean Intellectual Property Office, the disclosure of which is incorporated herein by reference in its entirety.

BACKGROUND OF THE INVENTION

1. Field of the Invention

The present invention relates to a technique for system booting, and more particularly, to a method and apparatus for securely updating and boot code images.

2. Description of the Related Art

In general, in embedded systems, such as appliances, communication apparatuses, and setup boxes, nonvolatile storage devices have been widely used as storage mediums for storing and processing data. Further, the embedded system stores an operating system in the nonvolatile storage device, and is booted by the stored operating system to perform the operations. The operating system is primarily stored in the nonvolatile storage device in the form of images.

In order for a host to provide security, an operation system (OS) image recorded on a nonvolatile storage device by a vendor at the time of launch of a product is ensured to be booted with no change when the operating system is booted. For example, if the OS image and application programs are stored in a cellular phone, when the cellular phone is turned on and the OS image is loaded, a part of the OS image is changed by a cracker, and an execution logic is changed, which may cause the crash of security of a security module in the OS image. In this case, after the OS image is copied to a random access memory (RAM) and before a control is transferred, it is necessary to check whether or not the integrity of the OS image is preserved. Then, the control is transferred only when the integrity does not crash, such that the cracker does not change the OS image.

Presently, many vendors of the embedded systems need and provide methods of preserving the integrity of the OS image, but these methods are based on the fact that an algorithm for checking the integrity is under wraps, and keys in a CPU need to be stored in a tamper resistance module (TRM) region for protection. Accordingly, these methods are not perfect or a separate circuit needs to be provided. Further, a supporting method thereof may vary according to characteristics of the storage devices.

FIG. 1 is a diagram showing a secure booting apparatus for causing secure booting of an embedded system according to the related art.

The secure booting apparatus includes an operating system storage unit 10 that stores an operating system and a check value of an algorithm having a unique check value corresponding to the operating system, a memory unit 20, on which the operating system stored in the operating system storage unit 10 is loaded at the time of booting, and a control unit 30 that calculates a check value according to the loaded operating system through the algorithm used in storing the check value and judges integrity of the loaded operating system by comparing the stored check value and the calculated check value.

At this time, the operating system storage unit 10 has a nonvolatile storage region such that the stored operating system and check value are kept even though the power is turned off.

At the time of booting by the operating system, the secure booting apparatus further includes a boot code storage unit 40 that stores a boot code including information relative to a booting process, and a key storage unit 50 that encodes the operating system and the check value stored in the operating system storage unit 10 and stores keys for decoding the encoded operating system and check value. At this time, since the boot code storage unit 40 is in a read only mode, the boot code is not changed by any operation from the outside. In this case, as the algorithm used in calculating the check value, any algorithm can be used as long as it has a different check value, not the same check value, even though the operating system is changed by one bit.

The key storage unit 50 has a region, such as a TRM (Tamper Resistance Module) as a forgery protecting technique or the like, and protects the keys stored in the key storage unit 50 from external access. This is because the encoded operation system and check value stored in the operating system storage unit 10 may be changed when the keys stored in the key storage unit 50 are exposed to the outside. Further, the key storage unit 50 may be incorporated with a control unit 30 that controls the overall booting process or may be separately provided.

By the way, in many cases, the operating system needs to be continuously upgraded after the launch of the embedded system. In particular, products, such as a cellular phone, an MP3 player, and a PMP, need to rapidly adapt to environments by their characteristics. Accordingly, the installed operating system needs to be appropriately changed or upgraded later. In this case, when the keys are stored in the manner shown in FIG. 1, the change of the operating system by an unauthorized external access can be blocked, but the change of the operating system by an authorized vendor may also be blocked. However, when the change by the authorized person is permitted, an unauthorized change of the operating system may also be made. Therefore, there is a need for a countermeasure against the above-described problem.

SUMMARY OF THE INVENTION

Aspects of the present invention have been designed in order to address the above-described problems, and an aspect of the present invention is to provide a method and apparatus for blocking a change of an operating system by an unauthorized user while ensuring a change of an operating system by an authorized user.

Another aspect of the present invention is to provide a storage device that ensures a change of an operating system by an authorized user.

Aspects of the present invention are not limited to those mentioned above, and other aspects of the present invention will be apparently understood by those skilled in the art through the following description.

An aspect of the present invention provides a method of updating a code image in a storage medium storing an operating system having a first region, on which a boot code is loaded, a second region, in which a first code image is stored, and a third region, in which the boot code and first check data for verifying the first code image are stored. The method of updating a code image includes storing a second code image in the second region, extracting information about a secure one-way function from the first check data, and generating second check data for verifying the second code image using the extracted information of the secure one-way function and storing the generated second check data in the third region. When the second check data is set as a parameter of the secure one-way function, the first check data is generated.

Another aspect of the present invention provides a method of booting a code image in a storage medium storing an operating system having a first region, on which a boot code is loaded, a second region, in which a code image is stored, and a third region, in which the boot code and check data for verifying the code image are stored. The method of booting a code image includes reading the boot code stored in the third region and storing the read boot code in the first region, when the code image stored in the second region is an updated code image, not an initial code image, extracting a first function for confirming an authorized change of the code image in the third region storing information about the initial code image, a first result obtained by applying a first parameter to the first function, and a second result obtained by applying a second parameter to the first function in the third region storing information about the updated code image, and comparing the first result with a result obtained by applying the second result to the first function as a parameter and, when both results are the same, executing the code image.

Still another aspect of the present invention provides a storage device including a storage unit having a first region, on which a boot code is loaded and operated, a second region, in which a code image for operating a system is stored and which has a readable and writable memory device, and a third region, in which the boot code and signature information for verifying the code image are stored. Also, the storage device includes a control unit which reads the boot code of the storage unit and loads the read boot code on the first region, when the code image is an updated code image, not an initial code image, which extracts a first function for confirming an authorized change of the code image in the third region storing information about an initial code image and a first result obtained by applying a first parameter to the first function, which extracts a second result obtained by applying a second parameter to the first function in the third region storing information about the updated code image, and comparing the first result with a result obtained by applying the second result to the first function as a parameter and, when both results are the same, which executes the code image.

BRIEF DESCRIPTION OF THE DRAWINGS

The above and other aspects of the present invention will become more apparent by describing in detail exemplary embodiments thereof with reference to the attached drawings, in which:

FIGS. 6A and 6B are diagrams illustrating the comparison between a case where an authorized user corrects the code image and a case where an unauthorized user corrects the code image according to the exemplary embodiment of the present invention.

DESCRIPTION OF EXEMPLARY EMBODIMENTS

Figure 1:
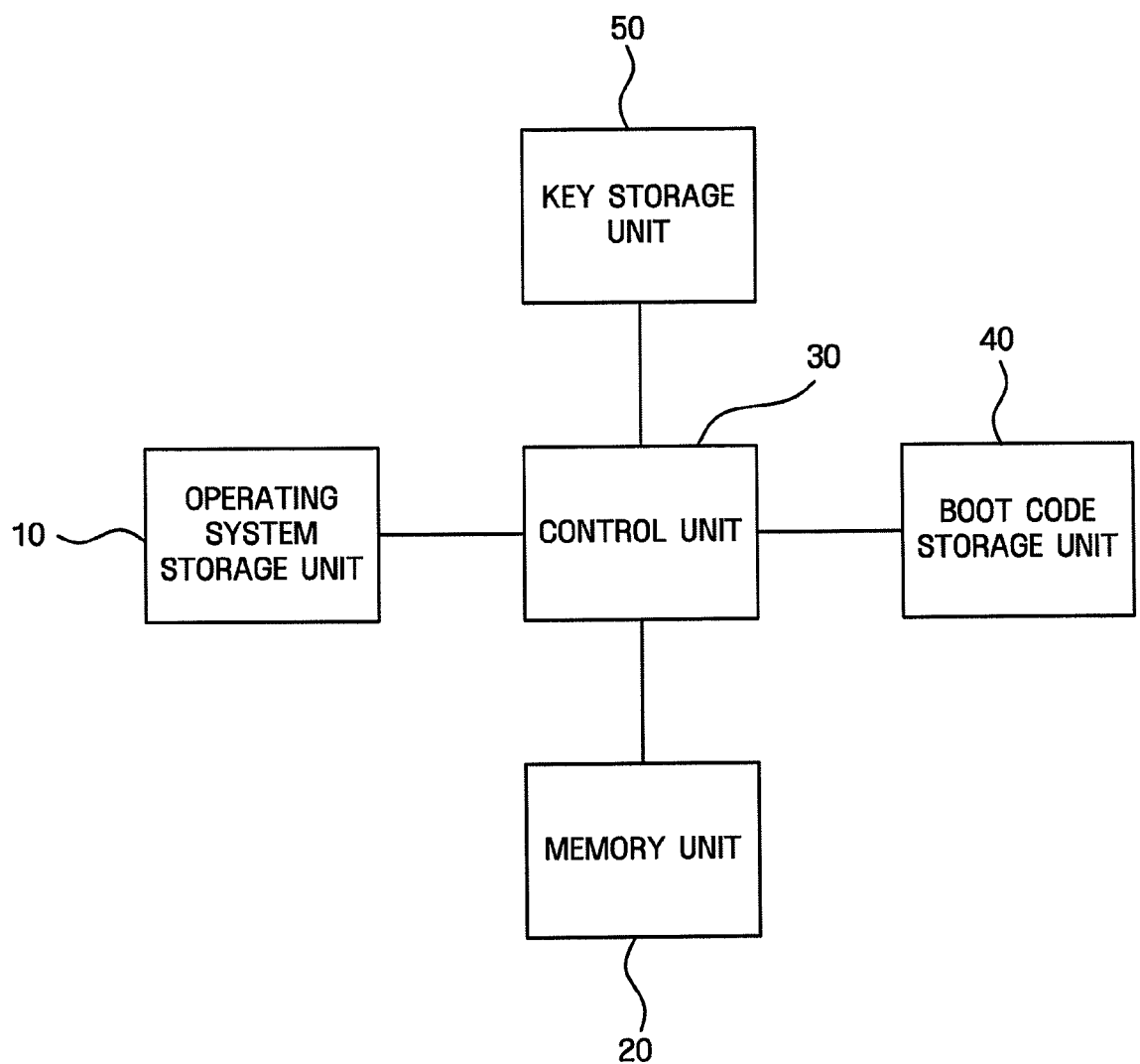
FIG. 1 is a diagram showing a secure booting apparatus according to the related art that allows an embedded system to be securely booted.

Aspects of the present invention and methods of accomplishing the same may be understood more readily by reference to the following detailed description of exemplary embodiments and the accompanying drawings. Aspects of the present invention may, however, be embodied in many different forms and should not be construed as being limited to the exemplary embodiments set forth herein. Rather, these exemplary embodiments are provided so that this disclosure will be thorough and complete and will fully convey the concepts of the invention to those skilled in the art, and the present invention will only be defined by the appended claims. Like reference numerals refer to like elements throughout the specification.

Aspects of the present invention will be described hereinafter with reference to block diagrams or flowchart illustrations of a method and an apparatus for securely updating and booting a code image according to an exemplary embodiment thereof. It will be understood that each block and combinations of blocks in the flowchart illustrations can be implemented by computer program instructions. These computer program instructions can be provided to a processor of a general-use computer, a special-use computer, or other programmable data processing apparatus to produce a machine, such that the instructions, which execute via the processor of the computer or other programmable data processing apparatus, create means for implementing the functions specified in the flowchart block or blocks.

Each block of the block diagrams may represent a module, segment, or portion of code, which comprises one or more executable instructions for implementing the specified logical function(s). It should also be noted that in some alternative implementations, the functions noted in the blocks may occur out of order. For example, two blocks shown in succession may in fact be executed substantially concurrently or the blocks may sometimes be executed in reverse order depending upon the functionality involved.

Figure 2:
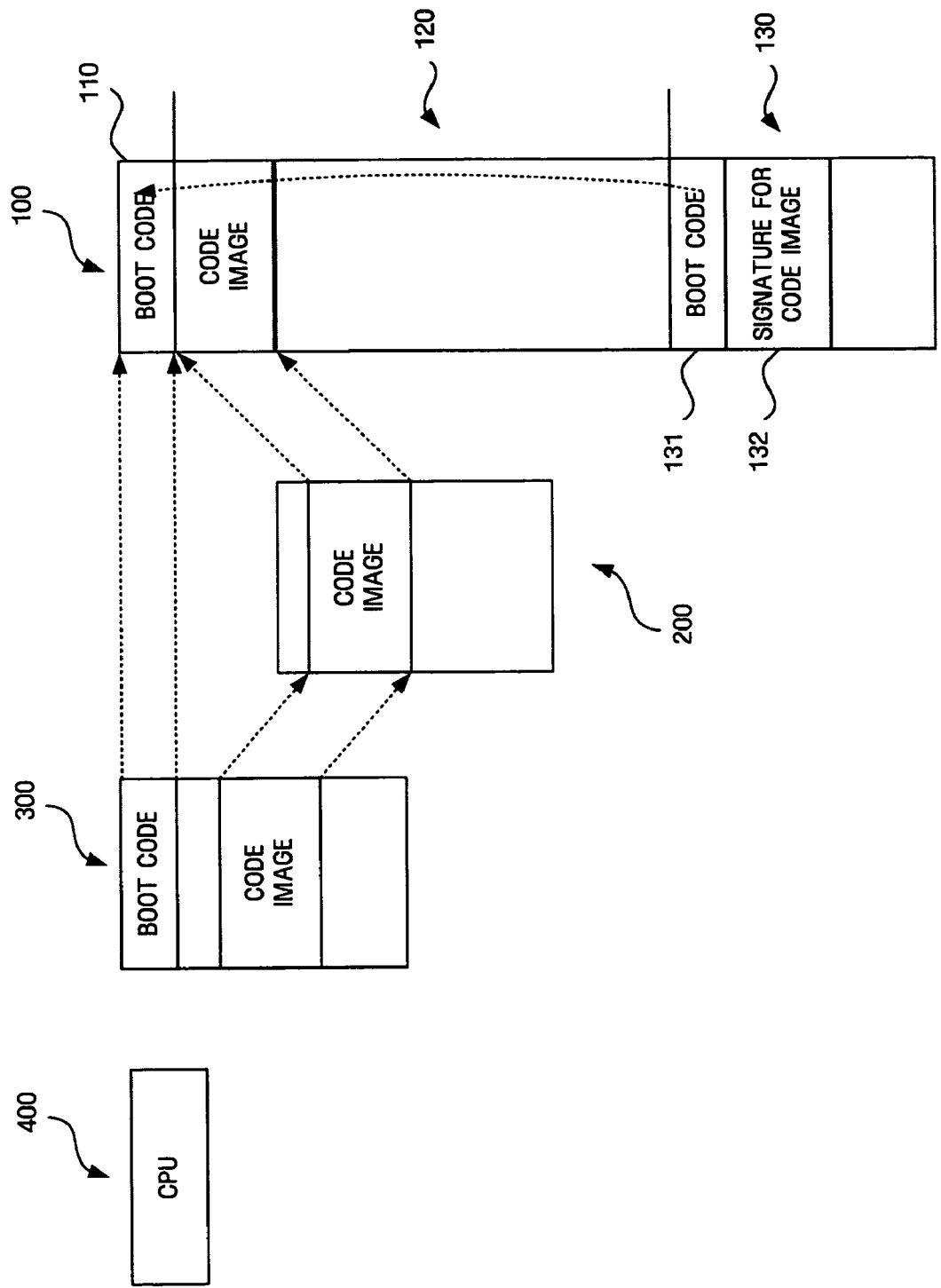
FIG. 2 is a diagram illustrating a method of driving an operating system in a storage device, to which an aspect of the present invention is applied.

FIG. 2 is a diagram illustrating a method of driving an operating system in a storage device, to which an aspect of the present invention is applied.

A storage device shown in FIG. 2 is mounted on a cellular phone, a digital camera, a notebook computer, a PDA, a PMP, or an MP3 player, and an operating system image for operating the apparatus is embedded in the storage device.

A nonvolatile storage device 100 for storing a code image in a non-volatile manner, a volatile storage device 200 that is required for executing the code image stored in the nonvolatile storage device 100, and a CPU 400, serving as a central processing unit, for executing the code image are used. Hereinafter, in the present specification, a flesh memory will be described as an example of a storage device storing a code image in a nonvolatile manner. Further, for the sake of the secure update, a secure one-way function is used.

The flash memory serving as the nonvolatile storage device 100 has a RAM region 110 that is automatically mapped to a specified region of a memory address space when power is supplied to the system, an R/W (read/write) region 120, in which repetitive programming and erasure of data are possible in a nonvolatile manner, an OTP (One Time Programmable) region 130, in which one time programming of data is possible but merely reading is possible after programming.

The regions 110, 120, and 130 can be implemented by a single memory device or may be implemented by a combination of three memory devices having the above-described characteristics. For example, the regions 120 and 130 can be implemented by flash memory devices, and the region 110 can be implemented by a RAM device. Then, these devices can be combined.

If power is supplied, a boot code 131 stored in a specified position of the region 130 is automatically copied to the RAM region 110, and the region 110 is changed to a region where only reading and execution are possible. Then, the CPU 400 executes machine-language commands in the region 110.

The boot code (or a boot loader) 131 is written into the one time programmable region 130, and the code image including the operating system image is written into the readable and writable region 120. The value of a signature 132 for checking a change of the code image is calculated and is written into the one time programmable region 130.

If power is applied to the system, the boot code 131 in the OTP region 130 is automatically copied to the RAM region 110.

A memory view 300 of the system is mapped so as to allow the region 110 to be used as a booting apparatus, and then the boot code is executed. When the boot code has a large volume and is not fully copied to the region 110, a remaining portion of the boot code not copied to the region 110 is copied to the volatile storage device 200.

The boot code copies the code image in the R/W region 120 to the volatile storage device 200. When the code image is directly executed in the region 120, the volatile storage device 200 may not be used.

Since the code image is stored in the R/W region, it may be changed. Accordingly, the value of a signature relative to the code image is calculated, and the calculated value of the signature relative to the code image is compared with the value of the signature 132 stored in the OTP region 130. At this time, only when both values are the same, booting continues to progress. Otherwise, booting is interrupted. Therefore, when the code image is changed by an unauthorized user, the system does not operate.

The value of the signature means a secure one-way function. The secure one-way function is a function that can easily calculate a result value, cannot know an input value from the result value, and cannot or rarely find two different input values having the same result value. Specifically, the secure one-way function means a function in which the input value and the result value are very difficult to determine.

Figure 3:
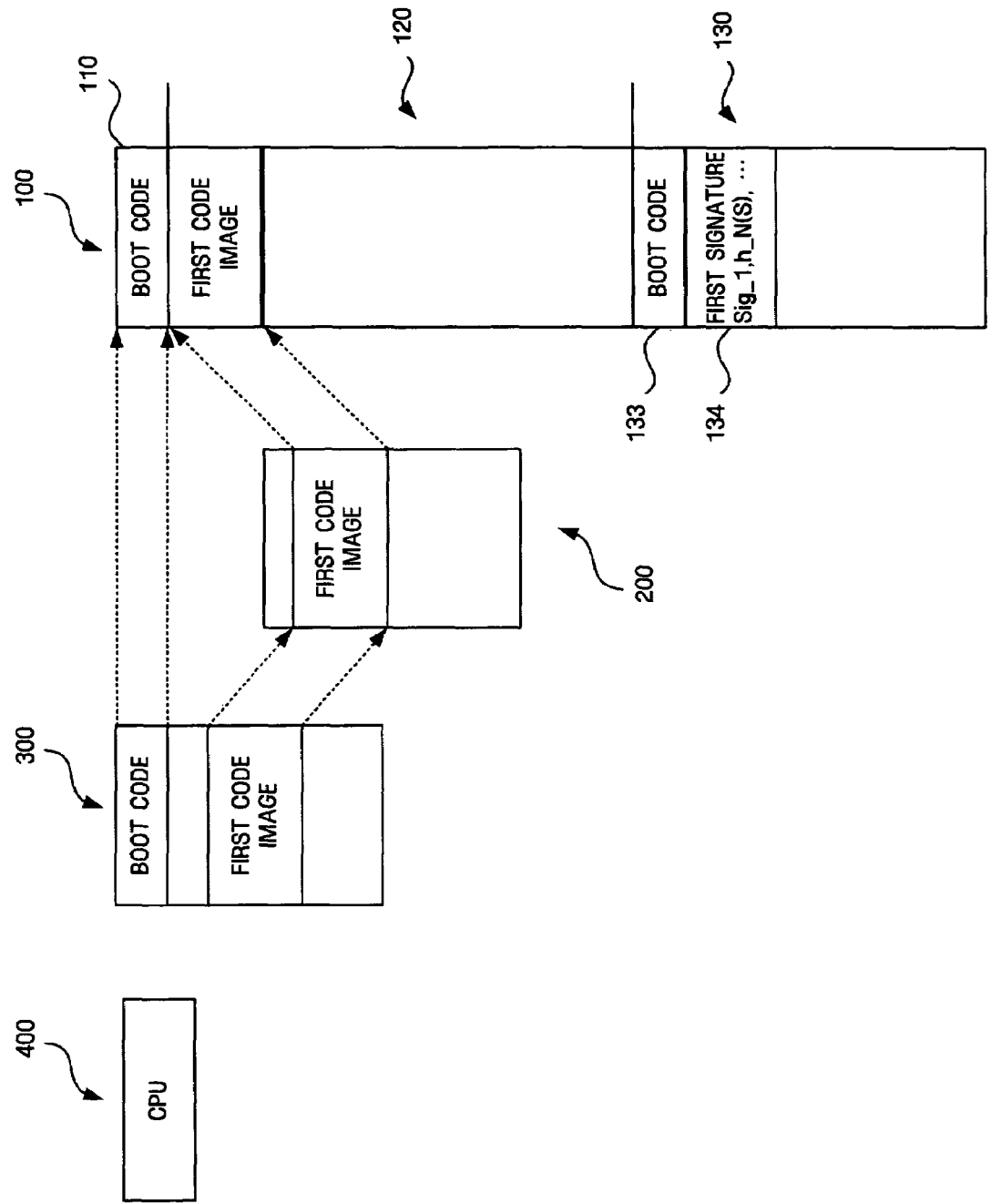
FIG. 3 is a diagram showing the relationship among a nonvolatile storage device storing a first code image, a volatile storage device, and a CPU.
Figure 4:
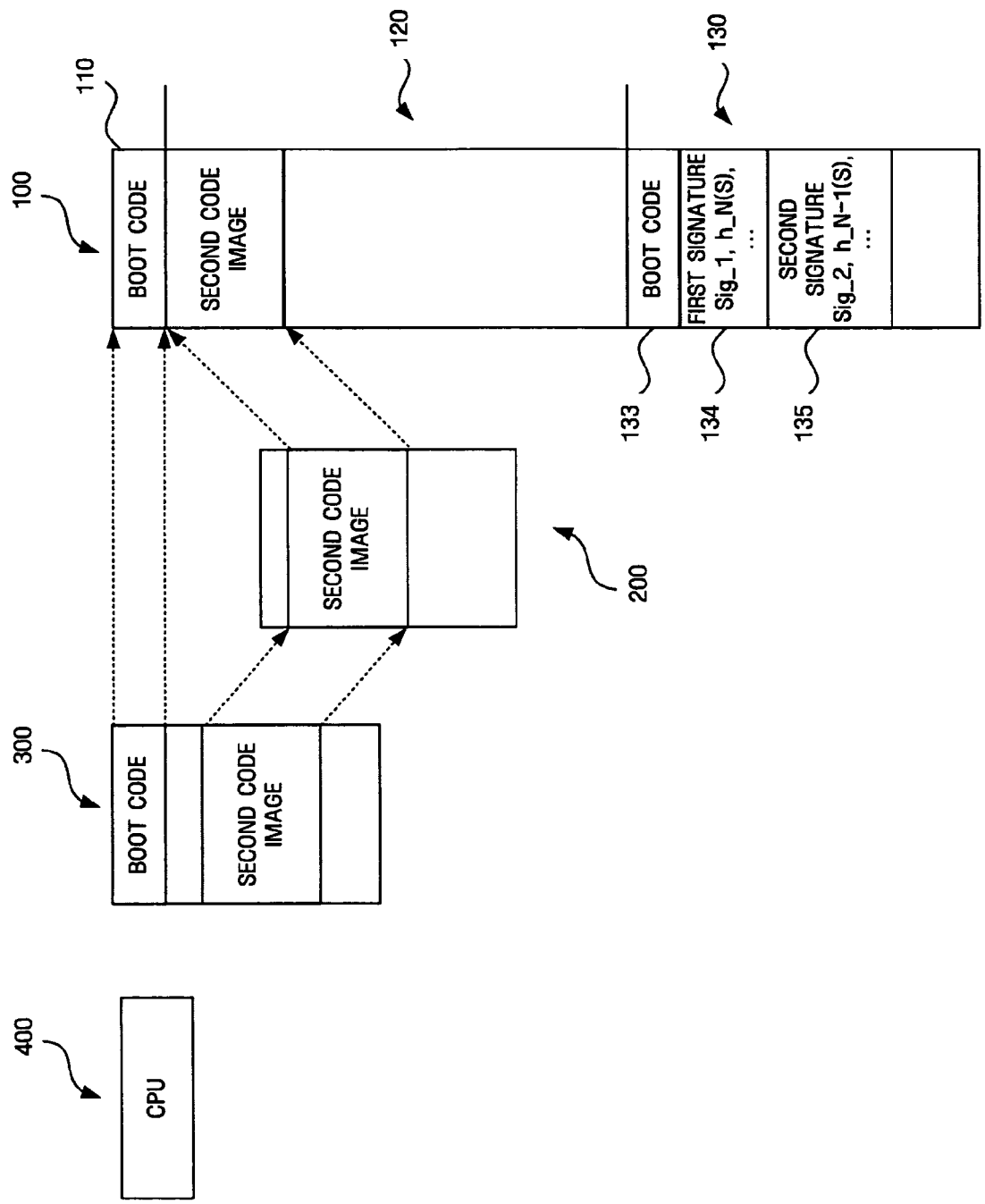
FIG. 4 is a diagram showing a case where an authorized user stores a changed code image according to an exemplary embodiment of the present invention in a nonvolatile storage device.

With the configuration of FIG. 2, it is possible to prevent the code image from being changed by an unauthorized user and to increase security of the code image. FIGS. 3 and 4 show the configuration of a nonvolatile storage device for improving security when an authorized user wants to change the code image.

Prior to the explanation, the secure one-way function will be described briefly. In case of a function of y=h(x), when the value x is known, it is easy to calculate the value y. However, when the value y is known, it is difficult to find the value x corresponding to the value y. Further, in case of y=h(x)=h(x'), it is difficult to find different values of x and x'.

FIG. 3 is a diagram showing the relationship among a nonvolatile storage device storing a first code image, a volatile storage device, and a CPU. In FIG. 3, a first code image is stored in the nonvolatile storage device 100. Signature information about the first code image and information about security are included in a first signature region 134.

When initially writing the code image and the boot code in the nonvolatile storage device 100, the following contents are written. A person having an authority capable of installing and changing the code image, such as a user or manufacturer, and a vendor keeps a value S under wraps. The value S is a value possessed by an authorized person, and can become a key value for keeping security.

A function h( ) satisfying conditions of the secure one-way function can be defined as follows. When h_0=h(S) and h_n+1(S)=h(h_n(S)), a user calculates h_N by substituting a comparatively large value N (for example, 100 or more). For example, h_N can be calculated by the following equation 1.

$$h\_3(S)=h(h\_2(S))=h(h(h\_1(S)))=h(h(h(h\_0)(S)))=h(h(h(h(S)))) \quad \text{Equation 1}$$

The user calculates the value of the signature for the first code image, and the value is called Sig_1. In order to calculate the value Sig_1, the function h( ) may be used or other secure one-way functions may be used.

A boot code 133 is written at the head of the OTP region 130 of the nonvolatile storage device 100, and the value Sig_1 is written into the first signature region 134 as the value of the signature for the first code image. In addition to the value Sig_1, an execution image of the function h( ), the values h_N and N, and information about the position and size of the code image in the R/W region 120 are written into the first signature region 134.

The value h_N means an execution value of h_N(S). h_N(S) can be calculated by the equation 1 as h(h_N−1(S)).

After the first code image is installed, and the signature for the first code image and information for allowing the change of the code image by the authorized user later are written into the first signature region 134, if the code is upgraded or a new function is added, a process for correcting the code image is required. Alternatively, the code image may be updated to a new code image.

FIG. 4 is a diagram showing a case where an authorized user stores a changed code image according to an exemplary embodiment of the present invention in a nonvolatile storage device.

When changing the code image, first, the value N stored in the first signature region 134 is read. Subsequently, h_N−1(S) is calculated for the value S (the key value kept by the authorized user under wraps). Next, the changed code image (second code image) is stored in the R/W region 120, and a value Sig_2 for verifying validity of the second code image is calculated. Next, the above-described information is stored in a second signature region 135. Since the result of h_N(S) and the information about the function f( ) and the value N are stored in the first signature region 134, and the authorized user can know the value S, h_N−1(S) can be calculated. Therefore, the authorized user stores the second code image to be changed or added in the R/W region 120, and stores the value Sig_2 for verifying validity of the second code image, the result of h_N−1(S), the function h( ), and the value of N−1 in the second signature region 135. At the time of future booting, through the result of h_N−1(S), it can be confirmed whether or not the code image is added by the authorized user. A verification process thereof will be described with reference to FIG. 5.

Figure 5:
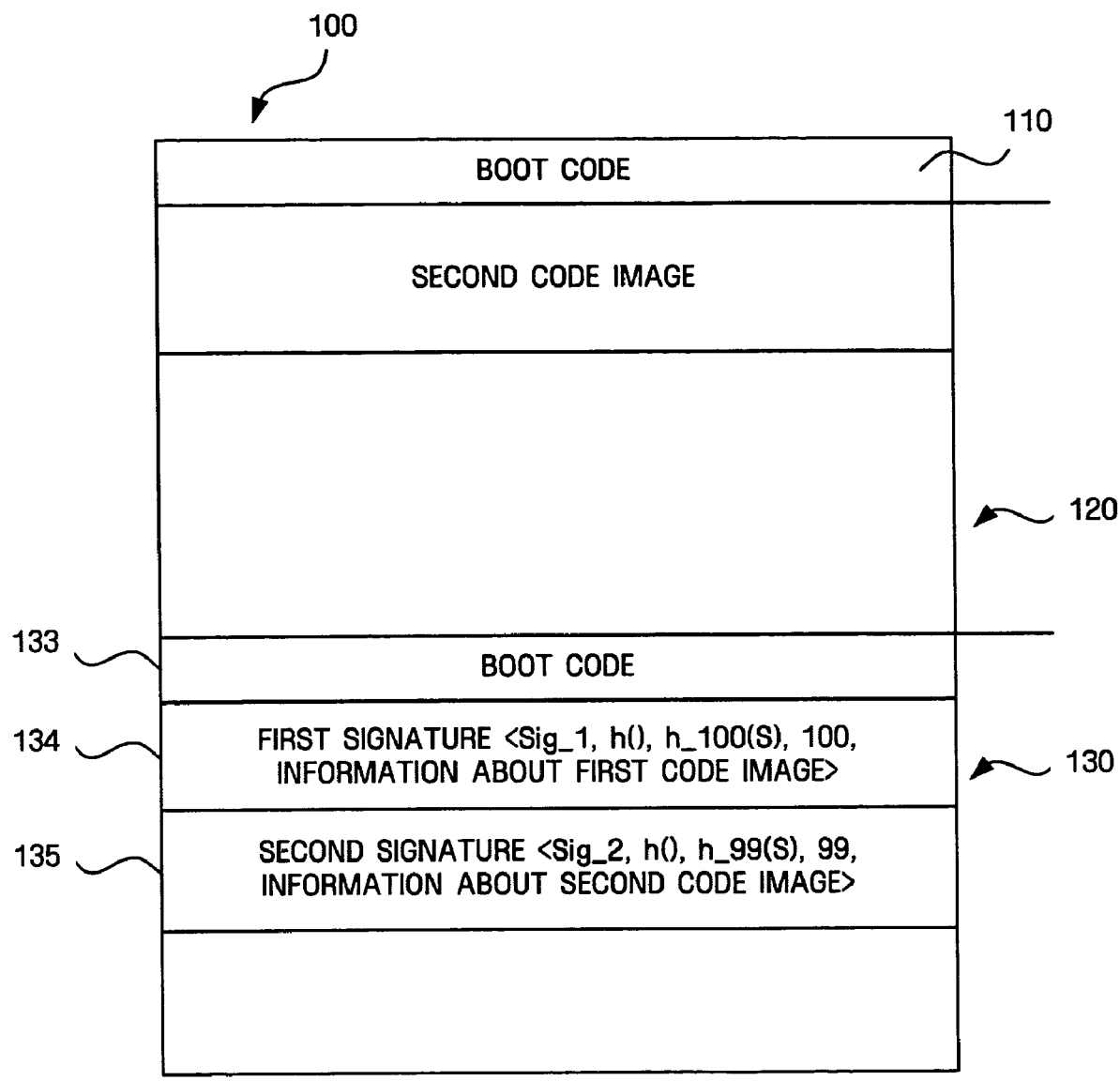
FIG. 5 is a diagram showing a process for verifying the changed code image according to the exemplary embodiment of the present invention.

FIG. 5 is a diagram showing a process for verifying the changed code image according to the exemplary embodiment of the present invention. In FIG. 5, N is set to 100. At the time of system booting, the information about the function h( ), the value of h_100 (S), and the value N of 100 are acquired from first signature region 134. Subsequently, the value of h_99(S), the value N of 99, the information about the second code image, and the value Sig_2 are read from the second signature region 135. The storage position and size of the second code image are read through the information about the second code image. Next, a verification process is performed on the second code image through the value Sig_2. When the value Sig_2 is compared with the second code image subjected to a predetermined verification algorithm, the value of h_100(S) is calculated with the value of h_99(S) as the input value of the function h( ) in order to confirm whether or not the second code image is updated by the authorized user. In this case, since the value of h_99(S) is K, and the value K is stored in the second signature region 135, h(K) can be calculated. Further, h(K) is h(h_99(S)) and also becomes h_100(S), and thus h(K) can be compared with the value stored in the first signature region 134. At this time, since the value S is possessed by the authorized user, the value of h_99(S) can be calculated by the authorized user. Therefore, it can be confirmed that the second code image is updated by the authorized user. If a person other than the authorized user writes h_99(D) in the second signature region with a value D different from the value S, it can be checked during booting that the values of h_100(S) and h_100(D) are different from each other, and thus booting can be interrupted.

FIGS. 6A and 6B are diagrams illustrating the comparison between a case where an authorized user corrects the code image and a case where an unauthorized user corrects the code image according to the exemplary embodiment of the present invention. The code image that is initially installed in a product is stored by the authorized user. FIG. 6A shows a case where the code image is updated by the authorized user after the initial installation of the code image, and FIG. 6B shows a case where the code image is updated by a person other than the authorized user after the initial installation of the code image.

Referring to FIG. 6A, when the authorized user wants to store a new code image, he can calculate h_99(S) on the basis of the value Sig_2 for verifying the code image, the value S, and a numerical value 100 in a first signature region 136.

Meanwhile, referring to FIG. 6B, even though an unauthorized user calculates the value Sig_2, he cannot know the value S, and thus he calculates h_99(D) by substituting an arbitrary value D. At this time, when h(h_99(D)) is executed by applying the value of h_99(D) to the function h( ) again, h_100(D) can be calculated. However, since h_100(D) is different from h_100(S), booting is interrupted. Therefore, when the unauthorized user changes the code, the change is verified through the value Sig_2. Further, even though the unauthorized user generates the value Sig_2, he cannot calculate the value of h_99(S). As a result, an unauthorized change of the code image by a computer virus, hacking, or the like can be prevented.

In the above process, the application results of the secure one-way function are obtained in a reverse order of N, N−1, N−2, . . . , but this is just an example. The present invention is not limited to this configuration. For example, the secure one-way function may be applied in an order of N, N−2, N−4, . . . . Moreover, the secure one-way function disclosed herein can be applied by various methods.

In the present specification, in order to verify whether or not the change of the code image is made by the authorized user, it is checked whether or not a check value for the code before the change can be extracted from a check value for the changed code. Next, when the check value for the code before the change can be extracted from the check value for the changed code, it is judged that the code image is changed by the authorized user, and the updated code image is executed.

Figure 7:
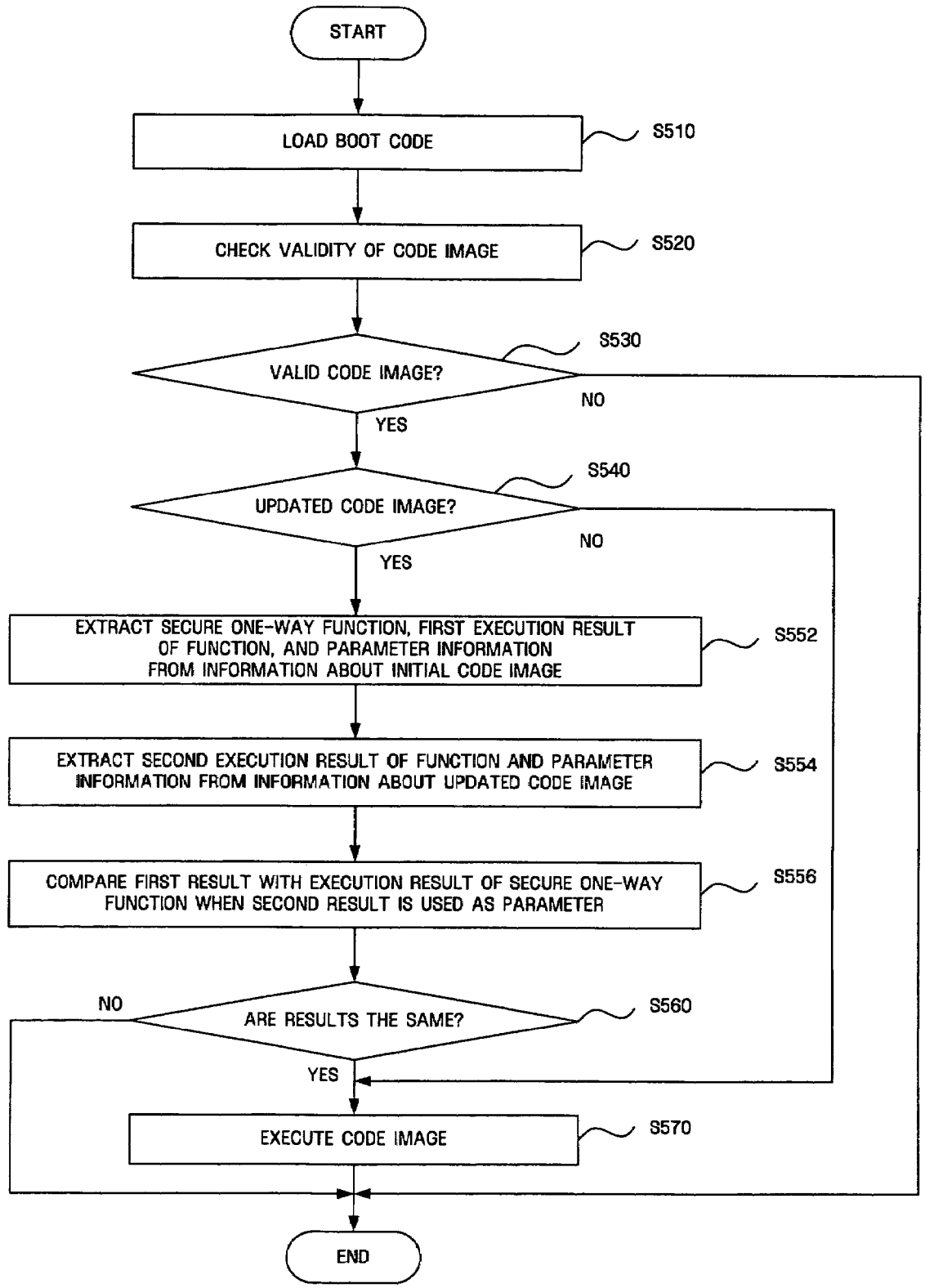
FIG. 7 is a diagram illustrating the confirmation on whether the updated code image is updated by an authorized user according to the exemplary embodiment of the present invention.

FIG. 7 is a diagram illustrating the confirmation on whether the updated code image is updated by an authorized user according to the exemplary embodiment of the present invention.

The boot code stored in the OTP region 130 is loaded (Step S510). Before the code image is executed according to the commands in the boot code, it is checked whether or not the code image is valid (Step S520). The validity check is to check whether or not the code image is changed. Here, a hash function for the code image and the application result values of the secure one-way function are stored in the OTP region 130 when the code image is stored, and then it can be checked through the application of the function whether or not the code image is changed. It is possible to check the validity of the code image with the values of Sig_1 and Sig_2. If the code image is not valid (Step S530), the code image is not executed, and the process ends.

If the code image is valid (Step S530), it is checked whether or not the code image is updated. If the code image is not updated, the code image is executed as it is.

If the code image is updated, it is confirmed whether or not the update is made by the authorized user. This confirmation is performed through Steps S552 to S556. First, information of an initial code image, for example, a first execution result of the secure one-way function in the first signature and parameter information are extracted (Step S552). Referring to FIG. 6A, h( ) is the secure one-way function, the first execution result of the function is h_100(S), and the parameter information is 100. The information of the value S does not need to be provided. This is because the execution result with the value S as a parameter is stored. Next, a second execution result of the function, and parameter information are extracted from the information about the updated code image (Step S554). The second signature can become the information about the updated code image. Here, referring to FIG. 6A, the second execution result of the function is the execution result of h_99(S), and the parameter information is 99. The parameter in the second signature for the updated code image is 99, and the parameter in the first signature for the original code image is 100. Accordingly, if h_99(S) is applied to the function h( ) as the parameter again, the result of h_100(S) in the first signature is obtained, and thus it can be known through the comparison between the results whether or not the code image is authentically updated. That is, like Step S556, the first result h_100(S) and the execution result of the secure one-way function with the second result h_99(S) as the parameter are compared. Next, if both results are the same (Step S560), since the updated code image is updated by the authorized user, the code image is executed (Step S570). Otherwise, the updated code image is not executed, and the process ends. In the above description, Steps S552, S554, and S556 can be performed prior to Step S520.

Although the present invention has been described in connection with the exemplary embodiments of the present invention, it will be apparent to those skilled in the art that various modifications and changes may be made thereto without departing from the scope and spirit of the invention. Therefore, it should be understood that the above exemplary embodiments are not limitative, but illustrative in all aspects. The scope of the present invention is defined by the appended claims rather than by the description preceding them, and all changes that fall within meets and bounds of the claims, or equivalence of such meets and bounds are therefore intended to be embraced by the claims.

According to aspects of the present invention, after the code image of the operating system is written into the nonvolatile storage region, and the check information associated with the code image is written into the OTP region, the authorized user (for example, a developer) can repeatedly and securely update the OS Image.

According to aspects of the present invention, when the code image of the launched product needs to be updated later, the update can be securely performed.

What is claimed is:

1. A method of updating a code image in a storage medium storing an operating system having a first region, on which a boot code is loaded, a second region, in which a first code image is stored, and a third region, in which the boot code and a first check data for verifying the first code image are stored, the method comprising:

storing a second code image in the second region;
   extracting information about a secure one-way function from the first check data; and
   generating second check data for verifying the second code image using the extracted information of the secure one-way function and storing the generated second check data in the third region,
   wherein, when the second check data is set as a parameter of the secure one-way function, the first check data is generated.

2. The method of claim 1, wherein the third region has a one time programmable memory device.

3. The method of claim 1, wherein the storage device is a OneNAND device.

4. A method of booting a code image in a storage medium storing an operating system having a first region, on which a boot code is loaded, a second region, in which a code image is stored, and a third region, in which the boot code and a check data for verifying the code image are stored, the method comprising:

reading the boot code stored in the third region and storing the read boot code in the first region;
   when the code image stored in the second region is an updated code image, not an initial code image, extracting a first function for confirming an authorized change of the code image in the third region storing information about the initial code image, a first result obtained by applying a first parameter to the first function, and a second result obtained by applying a second parameter to the first function in the third region storing information about the updated code image;
   comparing the first result with a result obtained by applying the second result to the first function as a parameter; and
   when both results are the same, executing the code image.

5. The method of claim 4, wherein the third region has a one time programmable memory device.

6. The method of claim 4, wherein the first function is a secure one-way function having characteristics that different output values are generated when input values are different from each other, and it is difficult to obtain the input values from the output values.

7. The method of claim 4, wherein the storage device is a OneNAND device.

8. A storage device comprising:

a storage unit comprising a first region, on which a boot code is loaded and operated, a second region, in which a code image for operating a system is stored and which has a readable and writable memory device, and a third region, in which the boot code and signature information for verifying the code image are stored; and
   a control unit which reads the boot code of the storage unit and loads the read boot code on the first region, when the code image is an updated code image, not an initial code image, which extracts a first function for confirming an authorized change of the code image in the third region storing information about an initial code image and a first result obtained by applying a first parameter to the first function, which extracts a second result obtained by applying a second parameter to the first function in the third region storing information about the updated code image, which compares the first result with a result obtained by applying the second result to the first function as a parameter, and when both results are the same, executes the code image.

9. The storage device of claim 8, wherein the third region has a one time programmable memory device.

10. The storage device of claim 8, wherein the first function is a secure one-way function having characteristics that different output values are generated when input values are different from each other, and it is difficult to obtain the input values from the output values.

11. The storage device of claim 8, wherein the storage device is a OneNAND device.

* * * * *